United States Patent [19]

Hihara

[11] 4,167,118

[45] Sep. 11, 1979

[54] WHEEL FIXING DEVICE

[75] Inventor: Yukiyosi Hihara, Fujinomiya, Japan

[73] Assignee: Yasui Sangyo Co., Ltd., Fujinomiya, Japan

[21] Appl. No.: 904,464

[22] Filed: May 10, 1978

[51] Int. Cl.² .............................................. G01M 1/04
[52] U.S. Cl. ................................. 73/487; 144/288 A
[58] Field of Search ............ 73/487, 485; 144/288 A; 157/1.24

[56] References Cited

U.S. PATENT DOCUMENTS

| | | | |
|---|---|---|---|
| 3,349,626 | 10/1967 | Palacios | 73/487 |
| 3,583,238 | 6/1971 | Haynes | 73/487 |
| 4,070,915 | 1/1978 | Caroff | 73/487 |

FOREIGN PATENT DOCUMENTS 1195071 6/1965 Fed. Rep. of Germany ............. 73/487

Primary Examiner—James J. Gill
Attorney, Agent, or Firm—Zarley, McKee, Thomte, Voorhees & Sease

[57] ABSTRACT

A wheel fixing device for a wheel balancer, by which all types of vehicle wheels can be mounted in a simple manner between a flange portion of an adapter and a push member which includes a plurality of links, each link having a pin for holding a vehicle wheel, the number and the position of the pin being changed according to the type of the wheel.

6 Claims, 5 Drawing Figures

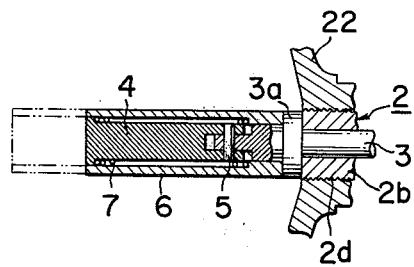
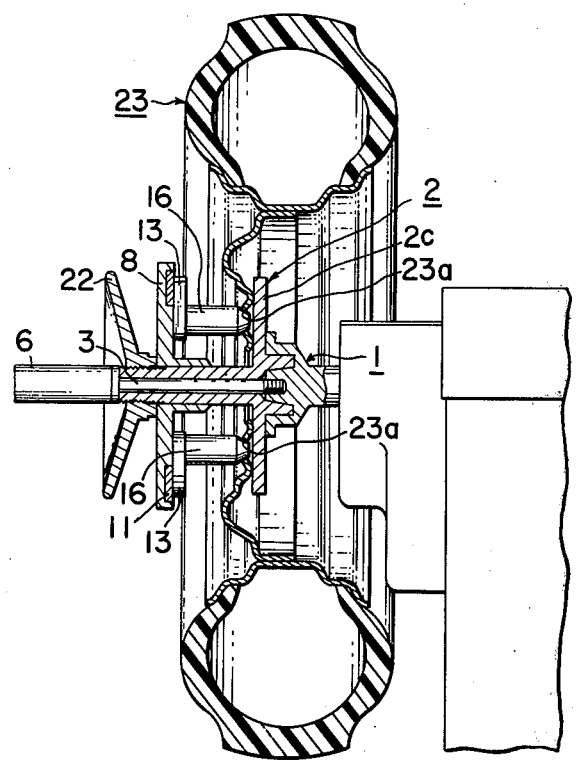
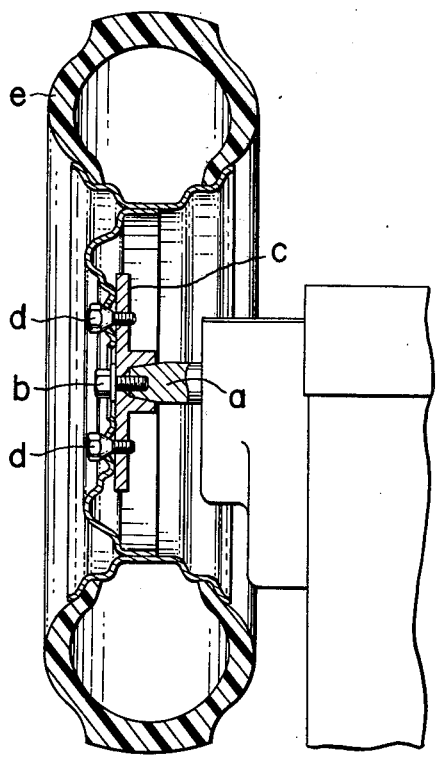

WHEEL FIXING DEVICE

The present invention relates to a wheel fixing device for a wheel balancer.

For a conventional wheel fixing device, as shown in FIG. 5, at the end of the axle a of the wheel balancer in fixed a circular adapter c by a bolt b. The vehicle wheel e is then fixed to the adpator c by the bolts d screwed into suitable positions in the adaptor c.

However, this device has defects, for example, whenever the type of vehicle wheel changes, the adaptor has to be exchanged depending of on the type of vehicle wheel there are many different numbers and arrangements of fixing holes. Further, much trouble is involved to do up the bolts.

It is an object of the present invention to provide a wheel fixing device for a wheel balancer free from the abovementioned defects, in which all types of vehicle wheels can be mounted by a simple operation, and which has a simple structure.

According to the present invention there is provided a wheel fixing device for a wheel balancer having an axle, comprising:
- an adaptor comprising a shaft portion which is attached to the end surface of the axle and extends coaxially from the axle, and a flange portion which is adjacent ot the end surface of the axle;
- an adaptor mounting means for mounting coaxially the adaptor to the axle;
- a push member which is slidably fitted on the shaft portion of the adaptor, which has an annular groove facing the flange portion in its outside portion, and which includes a plurality of mounting holes arranged inside of the annular groove at the same distance from the axis of the adaptor;
- a coupling ring which is fitted into the annular groove of the push member and includes a plurality of slots arranged radially corresponding to the mounting holes in number and position;
- a plurality of links, each being provided with a first pin which is attached to one corner of the link and is fitted into the mounting hole, and a second pin which is fitted into the slot of the coupling ring, which are pivoted around the first pin by rotating the coupling ring;
- a plurality of third pins for holding a vehicle wheel attached to the other corner of the link and facing the flange portion; and
- a closing handle which is screwed on the shaft portion of the adaptor and closes the adaptor to the flange portion thereof so that the wheel may be secured between the push member and the flange portion of the adaptor.

The present invention will now be explained in terms of the embodiment with reference to the attached drawings, in which:

FIG. 3 is a horizontal section along the line III—III in FIG. 1;

FIG. 4 is a central vertical section of a wheel fixing device of the present invention in use; and FIG. 5 is a central vertical section of a conventional wheel fixing device in use.

Figure 1:
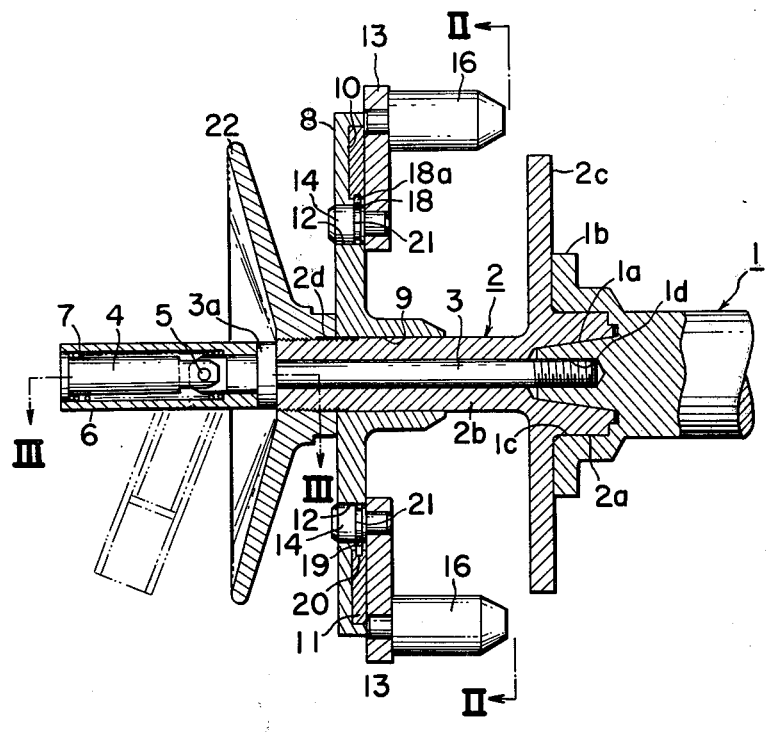
FIG. 1 is a central vertical section of a wheel fixing device of the present invention.

Referring to FIGS. 1 to 4, 1 is a axle of a wheel balancer. At its protruding end is arranged a central projection 1a and a flange 1b and between them a circular groove 1c. Also, at the center of the central projection 1a is provided a threaded hole 1d.

2 is an adaptor at one end of which is a circular projection 2a which fits into the groove 1c of the axle. The adaptor 2 is fixed to the end surface of the axle 1 by a screwed rod 3 running through the center of the shaft portion 2b, the right hand end as shown in FIG. 1 of the screwed rod 3 being screwed into the threaded hole 1d of the axle 1.

Between the circular projection 2a and the shaft portion 2b of the adaptor 2 is provided a large flange portion 2c. Around the outside of the free end of the shaft portion 2b a threaded portion 2d is cut.

Near the left hand end as seen in FIG. 1 of the threaded rod 3 is formed a flange portion 3a which abuts the left end of the adaptor 2.

As shown in FIGS. 1 and 3, both sides of the left end of the screwed rod 3 are cut away so that it has the shape of a flat member, and the swing rod 4 is coupled at its fork-like end by a pin 5 to the flattened end of the screwed rod 3, so as to swing freely.

A circular tube-shaped handle 6 forms a sheath around the left hand end of the screwed rod 3 and the swing lod 4. In the gap between the handle 6 and the swing rod 4 is inserted a compression spring 7. By means of this spring, the handle 6 is ordinarily pushed to the right, is that normally the right hand end of the handle 6 is held in contact with the flange portion 3a as shown by the solid line indications in FIGS. 1 and 3, thus preventing the swing rod 4 from being able to fold about the pin 5.

However, by sliding the handle 6 leftwards against the compression spring 7, in the manner shown by a two-dotted line in FIG. 3, the handle 6 can then be moved in a direction at right angles to the pin 5, and thus bent in a radial direction away from the axis of the screwed rod 3. By this means, when the screwed rod 3 is to be screwed or unscrewed to the axle, a large torque can be exerted on the screwed rod 3 which is extremely convenient.

8 is a circular push member, which has a central hole 9 into which is freely inserted the shaft portion 2b of the adaptor 2. On the right-facing surface of the push member 8, as seen in FIG. 1, is formed a shallow groove 10 whose shape is a circle with the axis of the adaptor 2 as its center. In this groove 10 a coupling ring 11 is inserted so as to be able to turn freely.

At a position inward of the groove 10 are formed several mounting holes 12 all at the same distance from the axis of the adaptor 2. The mounting holes 12 are formed in positions at a constant radial distance from the center of the push member 8 in the directions of the numerals "3", "4", "5" (see FIG. 2) engraved on the push member 8.

13 indicates a set of links each of substantially semicircular shape with a first pin 14 mounted in one corner and a second pin 15 (see FIG. 2) mounted near the middle of the curved edge, these two pins both facing away from the flange 2c. Then on each link 13, a third pin 16, used to hold the vehicle wheel, is mounted in the other corner facing the flange portion 2c of the adaptor 2.

Figure 2:
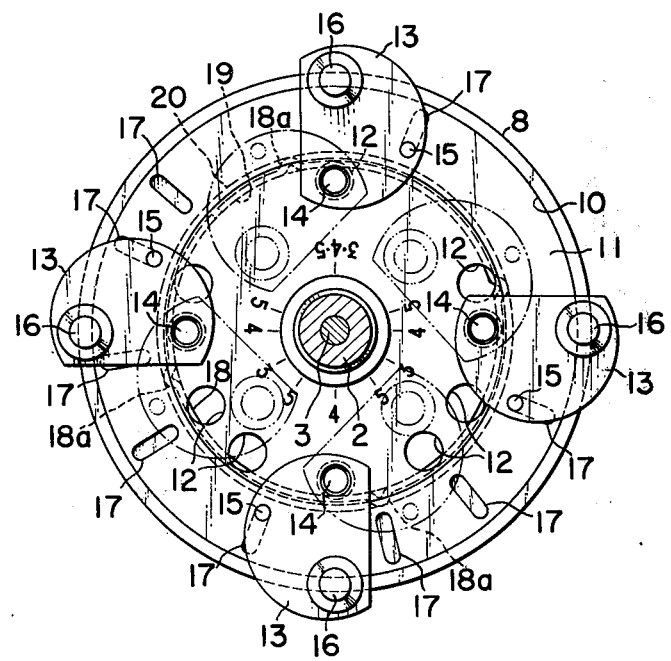
FIG. 2 is a vertical section along the line II—II in FIG. 1.

In the embodiment shown in the drawings, there are four links 13, and their respective pins 14 are inserted into those of the holes 12 in the directions indicated by the numeral "4" engraved on the push member 8 while respective pins 15 are inserted in the elongated slots 17 formed in the coupling ring 11 and extending radially therein (see FIG. 2). These slots 17 correspond to the holes 12 in both number of position.

As the coupling ring 11 is rotated relation to the push member 8, each link 13 turns through the same angle about its corresponding pin 14, and so the radius of the circle in which the pins 16 for holding the vehicle wheel are distributed can be increased or decreased to match the radius of the circle in which the fixed holes of the vehicle wheel are distributed.

Furthermore, it is also possible to accomodate wheels with either 3 or 5 fixing holes. In this case 3 or 5 each of links 13 and pins 14, 15 and 16 are used, and the pins 14 are inserted in the holes 12 in the directions indicated by the numerals, 37 3" or "5" respectively, and the pins 15 are inserted in the slots 17 in corresponding positions.

The spring 18 serves as a dual purpose retainer for both the coupling ring 11 and the pins 14, it is inserted into a circular groove 9 formed around the inner periphery of the groove 10 in the push member 8. Projecting kinks 18a arranged at suitable positions engage in a circular groove 20 formed in the inside surface of the coupling ring 11, thus forming a retainer for the coupling ring 11.

Again, at the points where the circular groove 19 intersects with the holes 12, the spring 18, inserted in the groove 19 projects into each hole 12, so that when a ping 14 is inserted in a hole 12 the spring 18 fits into a circular groove 21 formed in the pin 14. Thus the spring 18 also acts as a retainer for the pins 14, whichever holes they are inserted in.

The closing handle 22 is screwed onto the threaded portion 2d of the adaptor 2. As it is screwed up the vehicle wheel (see FIG. 4) is pressed against the flange 2c of the adaptor 2 by means of the push member 8.

When a vehicle wheel 23 is to be attached, the closing handle 22 and the push member 8 are detached from the adaptor 2 and the vehicle wheel is fitted onto the shaft portion 2b of the adaptor 2.

Next the number of links 13 corresponding to the number of fixing holes 23a of the vehicle wheel 23 are attached to the push member 8, and the push member 8 is attached to the adaptor 2. By moving one of the pins 16, the other pins 16 are moved corresponding by the coupling ring 11, and are thus adjusted to the positions corresponding to the fixing holes 23a of the vehicle wheel 23.

As the push member 8 is closed inwardly by the closing handle 22, the vehicle wheel 23 is gripped between the push member 8 and the flange 2c of the adaptor 2. Thus by means of the design of the device of the present invention described in previous paragraphs, the vehicle wheel 23 can be easily attached to the wheel balancer without the effort of doing up bolts or the like.

The device of the present invention offers the extreme convenience of being able to adapt just one device to vehicle wheels with a multitude of different positions and numbers of fixing holes, and moreover the changing of the links 13 and the positioning of the pins 16 are "finger-tip" operations, which is a desirable advantage.

Other advantages of the above-described embodiment of the present invention may be recited. Although the handle 6 of the screwed rod 3 used to attach the adaptor 2 is normally held in line with the screwed rod 3, when required it can be folded at an angle with the axis of the screwed rod 3, making the attaching and detaching of the screwed rod 3 easy.

Again, it is very convenient that the spring 18 is used in such a way that it fulfils the dual purposes of forming a retainer for the coupling ring 11 and a retainer for the pins 14, making the construction simple.

Furthermore, whether the pins 16 are attached to the links 13 by screwing, or by insertion of the stub portion of the pin 16 into the link 13 as shown in FIG. 1, by making the pins 16 removable, they can be freely changed to correspond to different sizes of or shapes of fixing hole in the vehicle wheel.

What is claimed is:

1. A wheel fixing device for a wheel balancer having an axle, comprising:
   an adaptor comprising a shaft portion which is attached to the end surface of the axle and extends coaxially from the axle, and a flange portion which is adjacent to the end surface of the axle;
   an adaptor mounting means for mounting coaxially the adaptor to the axle;
   a push member which is slidably fitted on the shaft portion of the adaptor, which has an annular groove facing the flange portion in its outside portion, and which includes a plurality of mounting holes arranged inside of the annular groove at the same distance from the axis of the adaptor;
   a coupling ring which is fitted into the annular groove of the push member and includes a plurality of slots arranged radially corresponding to the mounting holes in number and position;
   a plurality of links, each being provided with a first pin which is attached to one corner of the link and is fitted into the mounting hole, and a second pin which is fitted into the slot of the coupling ring, which are pivoted around the first pin by rotating the coupling ring;
   a plurality of third pins for holding a vehicle wheel attached to the other corner of the link and facing the flange portion; and
   a closing handle which is screwed on the shaft portion of the adaptor and closes the adaptor to the flange portion thereof so that the wheel may be secured between the push member and the flange portion of the adaptor.

2. A wheel fixing device according to claim 1, wherein each of the third pins attached to the links is interchangeable.

3. A wheel fixing device according to claim 1, further including an annular spring means having projection kinks projecting outwards, for rataining the coupling ring and the first pin, which is inserted into a circular groove formed around the inner periphery of the annular groove of the push member, and the projection kinks engaging in a circular groove formed in the inside surface of the coupling ring.

4. A wheel fixing device according to claim 3, wherein each of the third pins attached to the links is interchangeable.

5. A wheel fixing device according to claim 1 or claim 3, wherein the adaptor mounting means is a screwed rod having a pivotable handle in its free end, which runs through the center of the shaft portion of the adaptor and screwed to the end of the axle.

6. A wheel fixing device according to claim 5, wherein each of the third pins attached to the links is interchangeable.

* * * * *